US011046224B2

(12) United States Patent
Nagasawa

(10) Patent No.: US 11,046,224 B2
(45) Date of Patent: Jun. 29, 2021

(54) VEHICLE SEAT

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/752,856

(22) Filed: Jan. 27, 2020

(65) Prior Publication Data

US 2020/0307433 A1   Oct. 1, 2020

(30) Foreign Application Priority Data

Mar. 29, 2019   (JP) .............................. JP2019-066918

(51) Int. Cl.
*B60N 2/90* (2018.01)
*B60N 2/427* (2006.01)
*B60N 2/42* (2006.01)

(52) U.S. Cl.
CPC ......... *B60N 2/914* (2018.02); *B60N 2/42718* (2013.01); *B60N 2/4221* (2013.01)

(58) Field of Classification Search
CPC ................ B60N 2/914; B60N 2/42718; B60N 2/42709; B60N 2/427; B60N 2/42; B60N 2/4221
USPC ...................................................... 297/284.3
See application file for complete search history.

(56) References Cited

U.S. PATENT DOCUMENTS

| | | | | |
|---|---|---|---|---|
| 2014/0346819 | A1* | 11/2014 | Fukawatase | B60N 2/5657 297/180.1 |
| 2015/0091281 | A1* | 4/2015 | Nagasawa | B60N 2/42709 280/730.1 |
| 2019/0126878 | A1* | 5/2019 | Fukawatase | B60N 2/914 |
| 2020/0245770 | A1* | 8/2020 | Munechika | B60N 2/665 |

FOREIGN PATENT DOCUMENTS

| | | |
|---|---|---|
| JP | H4-115448 U | 10/1992 |
| JP | H10-229930 A | 9/1998 |

* cited by examiner

*Primary Examiner* — Mark R Wendell
(74) *Attorney, Agent, or Firm* — Smith, Gambrell & Russell, LLP

(57) ABSTRACT

A vehicle seat includes a seat cushion, a seat back, a storage member made of a flexible and gas-impermeable material, shaped into a bag, and configured to store fine particles, a cushion member having a flexibility lower than that of the storage member, and a gas supply/suction member configured to supply gas to the storage member and suck the gas from the storage member. The gas supply/suction member fluidizes the fine particles by supplying the gas to the storage member to make it easy to change a shape of the storage member. The gas supply/suction member solidifies the fine particles by sucking the gas from the storage member to make it hard to change the shape of the storage member. The storage member is disposed so as to face the occupant sitting on the vehicle seat. The cushion member is disposed on a back surface of the storage member.

16 Claims, 7 Drawing Sheets

VEHICLE SEAT

CROSS-REFERENCE TO RELATED APPLICATIONS

The present application claims priority from Japanese Patent Application No. 2019-066918 filed on Mar. 29, 2019, the entire contents of which are hereby incorporated by reference.

BACKGROUND

The disclosure relates to a vehicle seat equipped in a vehicle.

Known vehicle seats have been produced with taking into account a sitting posture recommended by makers, but without taking into account the sitting postures of individual occupants. If an occupant sits in a posture which is not recommended by the maker, the occupant fatigues in the body parts. In addition, this sort of vehicle seats is not produced taking into account the body type of the occupant.

Accordingly, for example, Japanese Unexamined Patent Application Publication (JP-A) No. H10-229930 discloses a vehicle seat including bags made of a flexible and air-impermeable material, filled with fine particles flowing in the bags, and disposed on a seat and a seat back. In the vehicle seat disclosed in JP-A No. H10-229930, the fine particles in the bags are flowed by using the weight of the occupant sitting on the seat to form the concave-convex surfaces of the seat and the seat back which conform to the sitting posture of the occupant, and the concave-convex surfaces of the seat and the seat back are maintained by sucking the air from the bags to fix the positions of the fine particles in the bags.

Meanwhile, there has been known a vehicle seat including a plurality of airtight bags filled with foam plastic particles as fine particles in the space between a surface skin member and a cushion body, which is disclosed, for example, in Japanese Unexamined Utility Model (Registration) Application Publication (JP-UM-A) No. H4-115448. In the vehicle seat disclosed in JP-UM-A No. H4-115448, the entire surface of the surface skin member is formed as a concave-convex surface conforming to the sitting posture of the occupant, and the concave-convex surface is maintained by reducing the pressure in the plurality of airtight bags so that the foam plastic particles tightly adhere to each other and are solidified.

SUMMARY

An aspect of the disclosure provides a vehicle seat. The vehicle seat includes a seat cushion, a seat back, a storage member, a cushion member, and a gas supply/suction member. The seat cushion is configured to support a hip of an occupant. The seat back is configured to support a back of the occupant. The storage member is made of a flexible and gas-impermeable material, shaped into a bag, and configured to store fine particles. The storage member is disposed in at one or both of the seat cushion and the seat back. The cushion member has a flexibility lower than that of the storage member. The cushion member is disposed in the one or both of the seat cushion and the seat back in which the storage member is disposed. The gas supply/suction member is configured to supply gas to the storage member and suck the gas from the storage member. The gas supply/suction member fluidizes the fine particles stored in the storage member by supplying the gas to the storage member to make it easy to change a shape of the storage member. The gas supply/suction member solidifies the fine particles stored in the storage member by sucking the gas from the storage member to make it hard to change the shape of the storage member. The storage member is disposed so as to face the occupant sitting on the vehicle seat. The cushion member is disposed on a back surface of the storage member.

An aspect of the disclosure provides a vehicle seat. The vehicle seat includes a seat cushion, a seat back, a storage member, a cushion member, and a gas supply/suction member. The seat cushion is configured to support a hip of an occupant. The seat back is configured to support a back of the occupant. The storage member is made of a flexible and gas-impermeable material, shaped into a bag, and configured to store fine particles. The storage member is disposed in one or both of the seat cushion and the seat back. The cushion member has a flexibility lower than that of the storage member. The cushion member is disposed in one or both of the seat cushion and the seat back in which the storage member is disposed. The gas supply/suction member is configured to supply gas to the storage member and suck the gas from the storage member. The gas supply/suction member fluidizes the fine particles stored in the storage member by supplying the gas to the storage member to make it easy to change a shape of the storage member. The gas supply/suction member solidifies the fine particles stored in the storage member by sucking the gas from the storage member to make it hard to change the shape of the storage member. The storage member is disposed so as to face the occupant sitting on the vehicle seat. The cushion member is disposed in the storage member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the vehicle seats disclosed in JP-A No. H10-229930 and JP-UM-A No. H4-115448, the fine particles are distributed over the whole of the seat and the seat back, and therefore the repulsive force from the vehicle seat tends to be applied evenly to the occupant, and accordingly there is room to improve the comfort of the occupant sitting on the vehicle seat.

It is desirable to provide a vehicle seat capable of improving the comfort of the occupant sitting on the vehicle seat containing fine particles.

Embodiment 1

Hereinafter, a vehicle seat according to Embodiment 1 of the disclosure will be described with reference to FIGS. 1 to 6A-6B.

<Schematic Configuration of Vehicle Seat>

The schematic configuration of a vehicle seat 10 according to Embodiment 1 of the disclosure will be described with reference to FIGS. 1 and 2.

Figure 1:
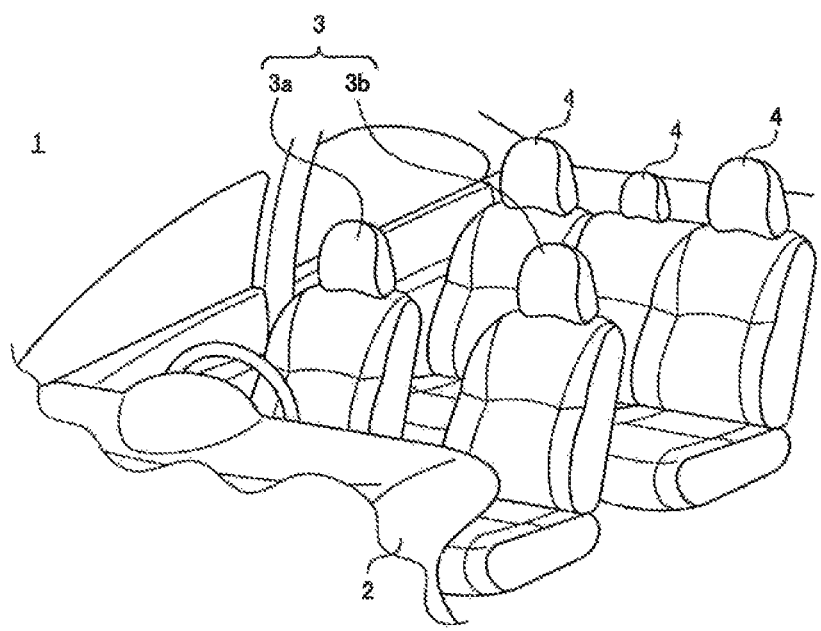
FIG. 1 is a perspective view illustrating the interior of a vehicle equipped with a vehicle seat according to Embodiment 1 of the disclosure.

FIG. 1 is a perspective view illustrating the interior of a vehicle 1 equipped with the vehicle seat 10. FIG. 2 is a perspective view illustrating the vehicle seat 10.

As illustrated in FIG. 1, a front seat 3 behind an instrument panel 2, and a rear seat 4 behind the front seat 3 are disposed in the interior of the vehicle 1. The front seat 3 includes a driver's front seat 3a and a front seat 3b next to the driver. With the embodiment, the vehicle seat 10 is applicable to at least one of the front seat 3 and the rear seat 4.

Figure 2:
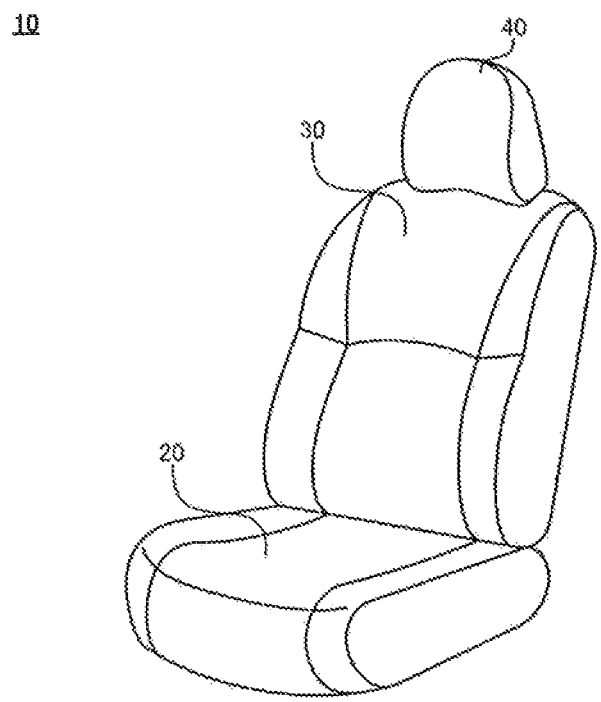
FIG. 2 is a perspective view illustrating the vehicle seat according to Example 1 of the disclosure.

As illustrated in FIG. 2, the vehicle seat 10 includes a seat cushion 20 fixed to the structure of the vehicle body, a seat back 30 configured to extend upward from the back end of the seat cushion 20, and a head rest 40 provided on the upper end of the seat back 30.

The seat cushion 20 is configured to support the hip and the legs of the occupant, and the seat back 30 is configured to support the back of the occupant. The head rest 40 is configured to support the head of the occupant.

<Configuration of Seat Cushion>

Figure 3:
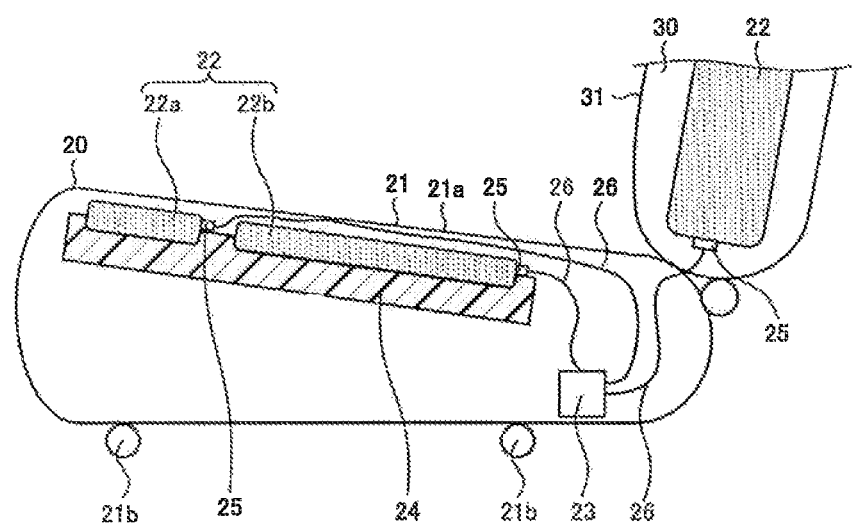
FIG. 3 is a longitudinal cross-sectional view schematically illustrating a seat cushion of the vehicle seat according to Embodiment 1 of the disclosure, taken along the front-to-back direction of the vehicle.
Figure 4:
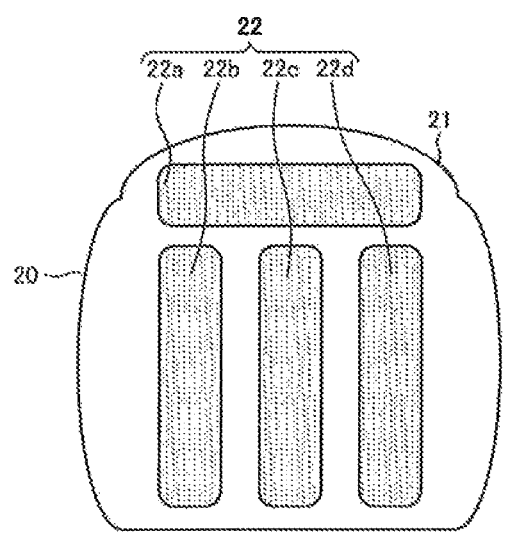
FIG. 4 is a horizontal cross-sectional view schematically illustrating the seat cushion of the vehicle seat according to Embodiment 1 of the disclosure, taken along the horizontal direction of the vehicle.

Next, the configuration of the seat cushion 20 of the vehicle seat 10 according to Embodiment 1 of the disclosure will be described with reference to FIGS. 3 and 4. FIG. 3 is a longitudinal cross-sectional view schematically illustrating the seat cushion 20 of the vehicle seat 10, taken along the front-to-back direction of the vehicle 1. FIG. 4 is a horizontal cross-sectional view schematically illustrating the seat cushion 20 of the vehicle seat 10, taken along the horizontal direction of the vehicle 1. Here, FIG. 2 will also be referred again if necessary.

As illustrated in FIG. 3, the seat cushion 20 includes a seat surface 21 configured to contact the hip of the occupant, a storage member 22 shaped into a bag to store fine particles, a gas supply/suction member 23 configured to supply gas to the storage member 22 and suck the gas from the storage member 22, and a cushion member 24 configured to support the storage member 22 from below.

In addition, a seat pressure sensor 21b configured to detect the pressure applied to the seat cushion 20 is provided under the seat cushion 20 in a support (not shown) of the seat cushion 20.

The seat surface 21 is covered with a surface skin member 21a made of, for example, cloth, real leather, or synthetic leather. Here, with Embodiment 1, the surface skin member 21a also covers a back face 31 of the seat back 30 configured to contact the back of the occupant.

The storage member 22 includes a plurality of bags 22a to 22d made of a flexible and gas-impermeable material. The plurality of bags 22a to 22d are provided below the seat surface 21 to face the hip of the occupant sitting on the vehicle seat 10.

As illustrated in FIG. 4, a front bag 22a is provided in the front part of the seat surface 21 in approximately parallel to the right-to-left direction of the vehicle seat 10. The front bag 22a is configured to support the legs of the occupant. Here, a plurality of front bags 22a may be juxtaposed in the front-to-back direction of the vehicle seat 10.

In addition, three back bags 22b, 22c and 22d are provided near the center of the seat surface 21. The back bags 22b, 22c and 22d extend along the front-to-back direction of the vehicle seat 10 and are juxtaposed in the right-to-left direction of the vehicle seat 10. The back bags 22b, 22c and 22b are configured to support the hip of the occupant. Here, the number of the back bags may be one, two, or equal to or more than four.

Each of the plurality of bags 22a to 22d includes a coupling member 25 configured to flow the air supplied to or sucked from the gas supply/suction member 23 in the bags 22a to 22d.

With Embodiment 1, the gas supplied to and sucked from the plurality of bags 22a to 22d is the air (outside air), but this is by no means limiting. The gas may be atmosphere as a medium to facilitate the fluidization and the solidification of the fine particles.

The storage member 22 is shaped into a bag and made of a flexible and gas-impermeable material, and therefore is airtight to the outside. The state of the fine particles stored in the plurality of bags 22a to 22d is switched between a state where the fine particles are fluidized and a state where the fine particles are solidified by using the gas supply/suction member 23.

The cushion member 24 is made of, for example, urethane, and has a flexibility lower than that of the plurality of bags 22a to 33d containing the fine particles.

Figure 6A:
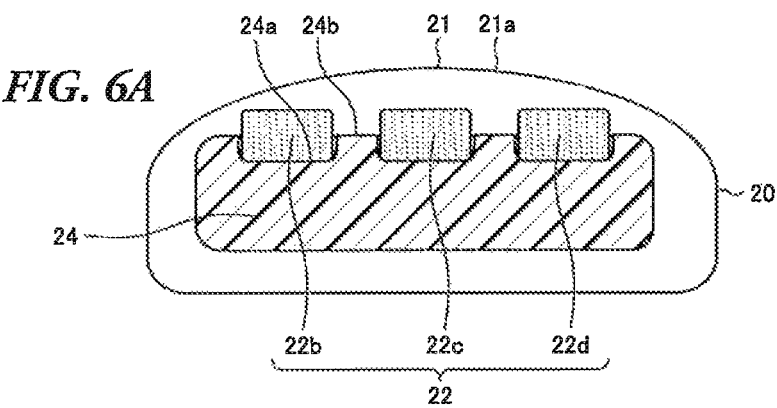
FIGS. 6A-6B are traverse cross-sectional views schematically illustrating the seat cushion of the vehicle seat according to Embodiment 1 of the disclosure, taken along the width direction of the vehicle.
Figure 6B:
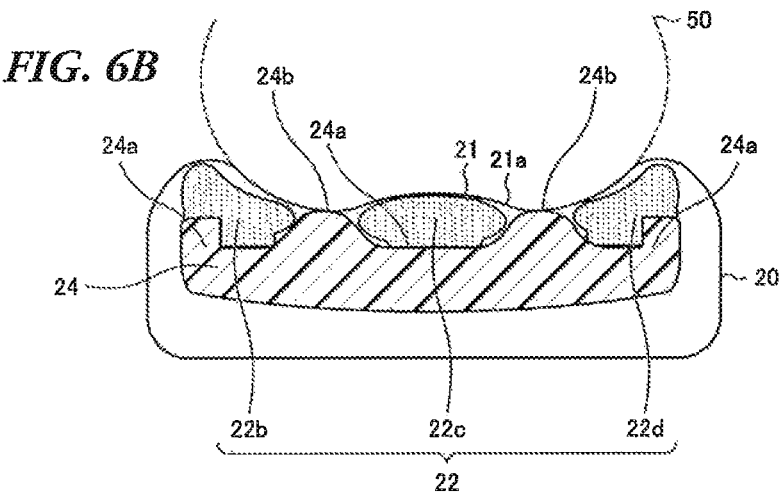

In addition, as illustrated in FIGS. 6A-6B, the surface of the cushion member 24 includes a plurality of concave portions 24a and convex portions 24b facing the plurality of bags 22a to 22d. The plurality of bags 22a to 22d are disposed in the plurality of grooves, respectively.

The gas supply/suction member 23 may be, for example, a compressor, and is coupled to the coupling member 25 of each of the plurality of bags 22a to 22d provided in the seat cushion 20 via a flow tube 26.

The gas supply/suction member 23 supplies the gas to each of the plurality of bags 22a to 22d or sucks the gas from each of the plurality of bags 22a to 22d in response to a control signal from a controller 100 described later.

The gas supply/suction member 23 supplies the gas to the storage member 22 via the flow tube 26 to expand the plurality of bags 22a to 22d to change the shape of the plurality of bags 22a to 22d, so that the fine particles stored in the plurality of bags 22a to 22d are fluidized. The fluidization of the fine particles stored in the plurality of bags 22a to 22d makes it easy to change the shape of the plurality of bags 22a to 22d.

On the other hand, the gas supply/suction member 23 sucks the gas from the plurality of bags 22a to 22d to shrink the plurality of bags 22a to 22d to change the shape of the plurality of bags 22a to 22d, so that the fine particles stored in the plurality of bags 22a to 22d are solidified. The solidification of the fine particles stored in the plurality of bags 22a to 22d makes it hard to change the shape of the plurality of bags 22a to 22d.

With Embodiment 1, one storage member 22 is disposed behind the back face 31 in the seat back 30 to face the back of the occupant sitting on the vehicle seat 10. The state of the fine particles stored in the storage member 22 provided in the seat back 30 is switched between a state where the fine particles are fluidized and a state where the fine particles are solidified by using the gas supply/suction member 23, in the same way as the storage member provided in the seat cushion 20.

<Electrical Configuration of Vehicle Seat>

Figure 5:
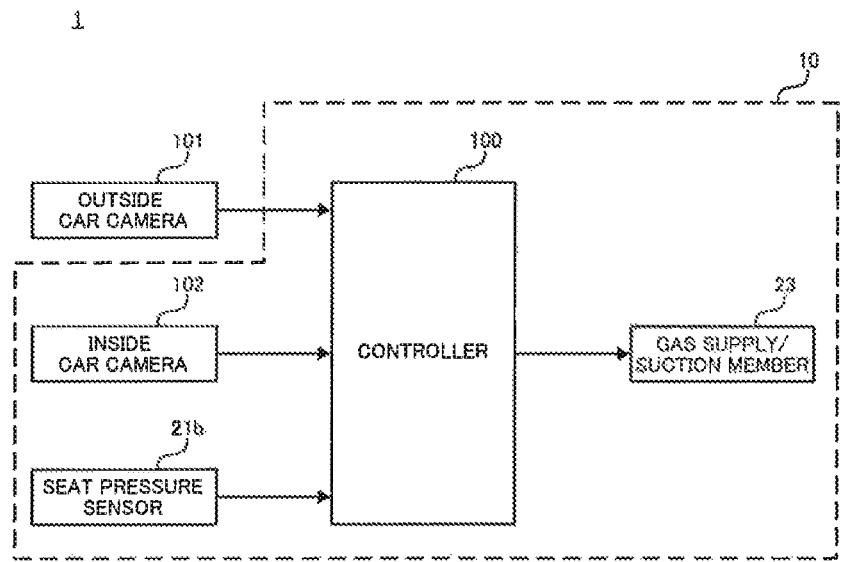
FIG. 5 is a block diagram illustrating the electrical configuration of the vehicle seat according to Embodiment 1 of the disclosure.

Next, the electrical configuration of the vehicle seat 10 according to Embodiment 1 of the disclosure will be described with reference to FIG. 5. FIG. 5 is a block diagram illustrating the electrical configuration of the vehicle seat 10.

As illustrated in FIG. 5, the vehicle seat 10 includes the controller 100. The controller 100 is communicably coupled to the seat pressure sensor 21b, the gas supply/suction member 23, an outside car camera 101 configured to capture images in the traveling direction of the vehicle 1, and an inside car camera configured to capture images of the occupant s in the vehicle 1.

The inside car camera 102 functions as a posture detector configured to detect the posture of the occupant sitting on the vehicle seat 10. In addition, the seat pressure sensor 21b allows the posture of the sitting occupant to be estimated based on the pressure distribution.

The controller 100 includes a processor, a memory, a storage (not shown) and so forth, and is configured to control the whole of the components of the vehicle seat 10 and perform control processing to realize various functions of the vehicle seat 10. The processor invokes programs according to Embodiment 1 and loads the programs into the memory, and then executes the programs in a predetermined sequence to perform the control of the vehicle seat 10 conforming to the sitting posture of the occupant.

To be more specific, the controller 100 detects the sitting posture of the occupant based on the pressure applied to the seat cushion 20 acquired from the seat pressure sensor 21b, or the image of the occupant acquired from the inside car camera 102. Then, the controller 100 causes the gas supply/suction member 23 to supply or suck the gas based on the detected sitting posture.

<Operation of Vehicle Seat>

Next, the operation of the vehicle seat 10 according to Embodiment 1 of the disclosure will be described with reference to FIGS. 6A-6B. FIGS. 6A-6B are traverse cross-sectional views schematically illustrating the seat cushion 20 of the vehicle seat 10, taken along the width direction of the vehicle. Here, the change in the state of the seat cushion 20 is illustrated in chronological order. FIGS. 3 to 5 will also be referred again if necessary.

As illustrated in FIG. 6A, when an occupant 50 does not sit on the seat cushion 20, the controller 100 causes the gas supply/suction member 23 to supply the gas to the plurality of bags 22a to 22d to fluidize the fine particles, so that it makes it easy to change the shape of the plurality of bags 22a to 22d.

Next, as illustrated in FIG. 6B, when the occupant 50 sits down on the seat cushion 20, the hip of the occupant 50 pushes the back bags 22b, 22c and 22d against the cushion member 24.

The surface of the cushion member 24 is changed in shape when the hip of the occupant 50 pushes the back bags 22b, 22c and 22d against the concave-convex surface of the cushion member 24 from above.

The flexibility of the cushion member 24 is lower than that of the back bags 22b, 22c and 22d, and therefore the deformed convex portions 24b stably support the hip of the occupant 50.

In addition, the back bag 22c provided in the center of the seat cushion 20 is deformed to conform to the shape of the hip of the occupant 50.

The fine particles in the left back bag 22b and the right back bag 22d are moved to the opposite ends of the seat cushion 20 which are not pushed by the hip of the occupant 50, respectively. Therefore, the left back bag 22b and the right back bag 22d are deformed to swell in the right and left ends of the seat surface 21.

Also, the fine particles in the front bag 22a are moved to the front part of the seat cushion 20 which is not pushed by the legs of the occupant 50, and therefore the front bag 22a is deformed to swell in the front part of the seat surface 21.

After that, when determining that the amount of change in the sitting posture of the occupant 50 which has been detected by the inside car camera 102 or the seat pressure sensor 21b is small, the controller 100 causes the gas supply/suction member 23 to suck the gas from the plurality of bags 22a to 22d to solidify the fine particles, so that it makes it hard to change the shape of the plurality of bags 22a to 22d. By this means, it is possible to conform the shape of the storage member 22 to the sitting posture of the occupant 50, and therefore to improve the stability of the occupant 50 sitting on the vehicle seat 1 by using the storage member 22 and the cushion member 24.

In addition, with Embodiment 1, the seat surface 21 of the outer periphery of the seat cushion 20 swells, and therefore it is possible to prevent the occupant 50 from swaying due to the inertia force by the gravitational acceleration applied in the front-to-back direction and the right-to-left direction of the vehicle 1 when the vehicle 1 is moving.

Also, the seat surface 21 of the front part of the seat cushion 20 swells, and therefore it is possible to prevent the occupant 50 from sliding forward and submarining in a front collision of the vehicle 1.

Embodiment 2

Figure 7A:
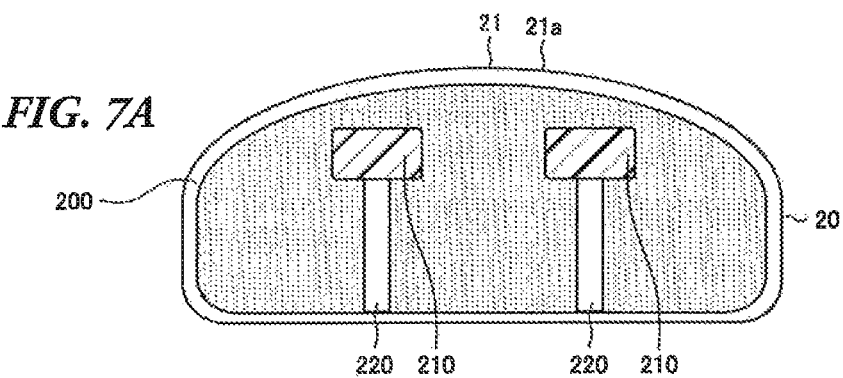
FIGS. 7A-7B are traverse cross-sectional views schematically illustrating the seat cushion of the vehicle seat according to Embodiment 2 of the disclosure, taken along the width direction of the vehicle.
Figure 7B:
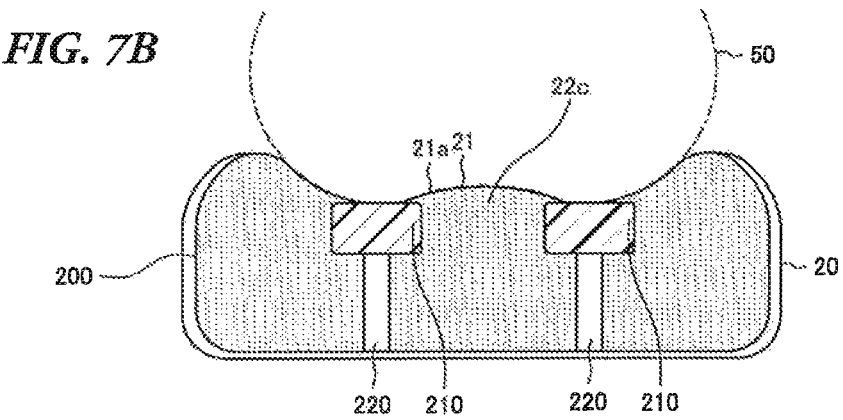

With Embodiment 1 described above, the cushion member 24 is disposed under the storage member 22, but this is by no means limiting. Cushion members 210 may be disposed in the storage member 22. The vehicle seat 10 according to Embodiment 2 of the disclosure will be described with reference to FIGS. 7A-7B. FIGS. 7A-7B are traverse cross-sectional views schematically illustrating the seat cushion 20 of the vehicle seat 10, taken along the width direction of the vehicle 1. Here, the change in the state of the seat cushion 20 is illustrated in chronological order. FIGS. 3 to 5 will also be referred again if necessary.

As illustrated in FIG. 7A, a plurality of cushion members 210, and cushion supports 220 configured to support the cushion members 210 from below are provided in a storage member 200.

The cushion members 210 are positioned to be able to support the hip of the occupant 50. The cushion members 210 are provided in the storage member 200 filled with fine particles which can flow in the storage member 200.

Each of the cushion supports 220 may be, for example, an elastic member such as a coil spring configured to be able to elastically support the cushion member 210 from below. Here, the cushion support 220 may be a non-elastic member made of, for example, iron, reinforced plastic, or resin. Alternatively, the cushion support 220 may be wrapped by a member to protect the surface or the elastic function.

Next, as illustrated in FIG. 7B, when the occupant 50 sits down on the seat cushion 20, the hip of the occupant 50 pushes against the storage member 200 to deform the storage member 200 to conform to the shape of the hip of the occupant 50.

The flexibility of the cushion members 210 is lower than that of the storage member 200, so that it is possible to stably support the hip of the sitting occupant 50 on the cushion member 210.

The cushion members 210 being pushed down by the hip of the occupant 50 are pushed back up by the elastic force of the cushion supports 220. In this way, with Embodiment 2, the cushion supports 220 can apply an appropriate repulsive force to the hip of the occupant 50, and therefore it is possible to improve the stability of the sitting occupant 50.

As described above, with Embodiment 2, the storage member 200 is deformed to conform to the shape of the hip of the occupant 50, and the hip of the occupant 50 is supported by the cushion members 210. Therefore, it is possible to prevent the occupant 50 from swaying due to the inertia force by the gravitational acceleration applied in the front-to-back direction and the right-to-left direction of the vehicle 1 when the vehicle 1 is moving, and consequently to improve the stability of the sitting occupant 50, in the same way as Embodiment 1.

Here, the cushion supports 220 are provided in the storage member 200, but this is by no means limiting. The cushion supports 220 may be provided outside the storage member 200. In this case, the lower surfaces of the cushion supports 220 are fixed to the seat cushion 20, and therefore it is possible to improve the stability of the sitting posture of the occupant 50.

With the embodiments as described above, the storage member and the cushion member(s) are provided in the seat cushion 20 of the vehicle seat 10. The storage member made of a flexible and gas-impermeable material is shaped into a bag, and configured to store fine particles. The flexibility of the cushion member(s) is lower than that of the storage member. The storage member is disposed near the cushion member(s). When the occupant 50 sits down on the vehicle seat 10, the sitting posture of the occupant 50 is fixed by the storage member and the cushion member(s). By this means, it is possible to improve the comfort of the occupant 50 on the vehicle seat 10 containing the fine particles.

<Others>

With the embodiments described above, the storage member and the cushion member (s) are provided in the seat cushion 20, but this is by no means limiting. The storage member and the cushion member(s) may be provided in the seat back 30. In this case, the positions of the storage member and the cushion member(s) are changed to fit the structure of the back of the occupant 50.

Moreover, with the embodiments described above, the plurality of storage members have the same flexibility, but this is by no means limiting. The plurality of storage members having different flexibilities may be applicable.

The invention claimed is:

1. A vehicle seat comprising:
   a seat cushion configured to support a hip of an occupant;
   a seat back configured to support a back of the occupant;
   a storage member made of a flexible and gas-impermeable material, shaped into one or more bags, and storing fine particles, the storage member being disposed in one or both of the seat cushion and the seat back;
   a cushion member having a flexibility lower than that of the storage member, the cushion member being disposed in the one or both of the seat cushion and the seat back in which the storage member is disposed; and
   a gas supply/suction member configured to supply gas to the storage member and suck the gas from the storage member, wherein:
   the gas supply/suction member fluidizes the fine particles stored in the storage member by supplying the gas to the storage member to make it easy to change a shape of the storage member;
   the gas supply/suction member solidifies the fine particles stored in the storage member by sucking the gas from the storage member to make it harder to change the shape of the storage member as compared to when the fine particles are fluidized;
   the storage member is disposed so as to face the occupant sitting on the vehicle seat; and
   the cushion member is disposed on a back surface of the storage member, and wherein at least a first of the one or more bags of the storage member is received in a recess defined by the cushion member such that, under a hardened state of solidification of the fine particles, cushion member material of the cushion member at least partially extends upward along a side surface of the first bag in the hardened state.

2. The vehicle seat according to claim 1, wherein the storage member includes a plurality of bags juxtaposed in a right-to-left direction of the vehicle seat.

3. The vehicle seat according to claim 2, wherein the plurality of bags that are juxtaposed in the right-to-left direction of the vehicle seat have cushion material of the cushion member extending therebetween as to render an adjacent pair of the juxtaposed bags independent of each other.

4. The vehicle seat according to claim 1, wherein the storage member includes a plurality of bags juxtaposed in a front-to-back direction of the vehicle seat.

5. The vehicle seat according to claim 4, wherein the plurality of bags that are juxtaposed in the front-to-back direction of the vehicle seat have cushion material of the cushion member extending therebetween as to render an adjacent pair of the juxtaposed bags independent of each other.

6. The vehicle seat according to claim 1, wherein
   the recess includes a concave portion and the cushion member material of the cushion member, that at least partially extends upward along a side surface of the first bag, defines a convex portion in a surface of the cushion member facing the storage member.

7. The vehicle seat according to claim 1, wherein the at least first of the one or more bags of the storage member, that is received in the recess defined by the cushion member, has a thickness, both when in the hardened and fluidized states, as to extend above an upper rim perimeter of the receiving recess in the cushion member.

8. The vehicle seat according to claim 1, wherein the storage member deforms in shape from a fluidized state to a hardened state, and wherein, when compressed and in the hardened state, the storage member is deformed as to extend laterally across the seat to a greater extent than when in the fluidized state.

9. A vehicle seat comprising:
a seat cushion configured to support a hip of an occupant;
a seat back configured to support a back of the occupant;
a storage member made of a flexible and gas-impermeable material, shaped into a bag, and storing fine particles, the storage member being disposed in one or both of the seat cushion and the seat back;
a plurality of cushion members each having a flexibility lower than that of the storage member, the cushion members being disposed in the one or both of the seat cushion and the seat back in which the storage member is disposed; and
a gas supply/suction member configured to supply gas to the storage member and suck the gas from the storage member, wherein:
the gas supply/suction member fluidizes the fine particles stored in the storage member by supplying the gas to the storage member to make it easy to change a shape of the storage member;
the gas supply/suction member solidifies the fine particles stored in the storage member by sucking the gas from the storage member to make it harder to change the shape of the storage member as compared to when the fine particles are fluidized;
the storage member is disposed so as to face the occupant sitting on the vehicle seat; and
the cushion members are disposed in the storage member as to be separated from one another by fine particles of the storage member.

10. The vehicle seat according to claim 9, wherein the storage member includes a plurality of bags juxtaposed in a right-to-left direction of the vehicle seat.

11. The vehicle seat according to claim 9, wherein the storage member includes a plurality of bags juxtaposed in a front-to-back direction of the vehicle seat.

12. A vehicle seat comprising:
a seat cushion configured to support a hip of an occupant;
a seat back configured to support a back of the occupant;
a storage member made of a flexible and gas-impermeable material, shaped into a bag, and configured to store fine particles, the storage member being disposed in one or both of the seat cushion and the seat back;
a cushion member having a flexibility lower than that of the storage member, the cushion member being disposed in the one or both of the seat cushion and the seat back in which the storage member is disposed;
a gas supply/suction member configured to supply gas to the storage member and suck the gas from the storage member, wherein the gas supply/suction member fluidizes the fine particles stored in the storage member by supplying the gas to the storage member to make it easy to change a shape of the storage member and solidifies the fine particles stored in the storage member by sucking the gas from the storage member to make it harder to change the shape of the storage member as compared to when the fine particles are fluidized,
wherein the storage member is disposed so as to face the occupant sitting on the vehicle seat, and wherein the cushion member is disposed in the storage member; and
a cushion support configured to support the cushion member from a back surface of the cushion member,
wherein the cushion support includes an elastic member having elasticity in a direction facing the occupant sitting on the vehicle seat.

13. The vehicle seat according to claim 12, wherein the storage member stores the fine particles both when the gas supply/suction member is supplying to, and sucking gas from, the storage member.

14. The vehicle seat according to claim 12, wherein the elastic member is a coil spring.

15. The vehicle seat according to claim 12, wherein the elastic member is positioned under the cushion support and is surrounded by fluidized particles of the storage member.

16. The vehicle seat according to claim 15, wherein the elastic member comprises a cover that is placed in contact with the surrounding fluidized particles of the storage member.

\* \* \* \* \*